Patented Sept. 30, 1930

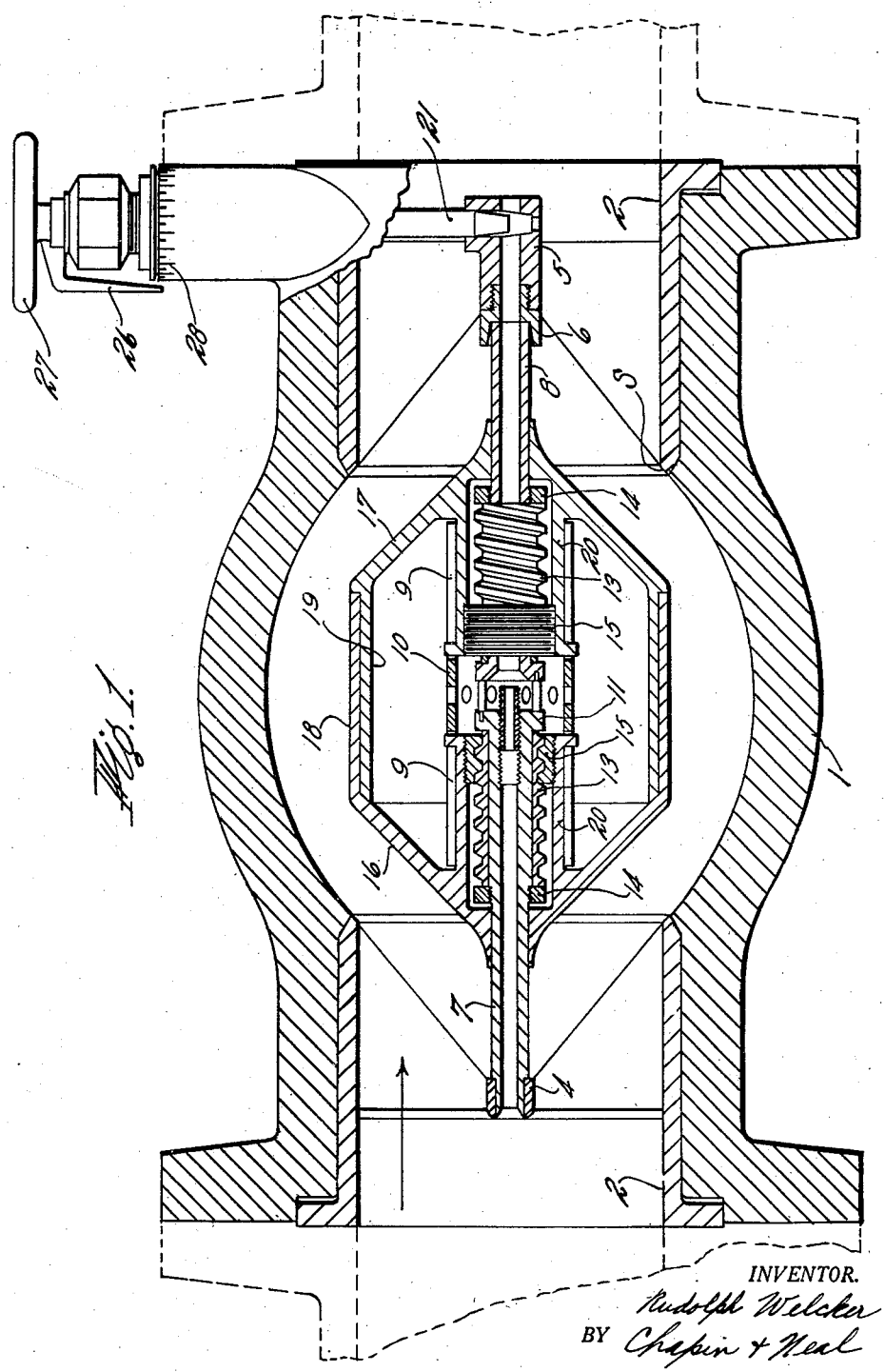

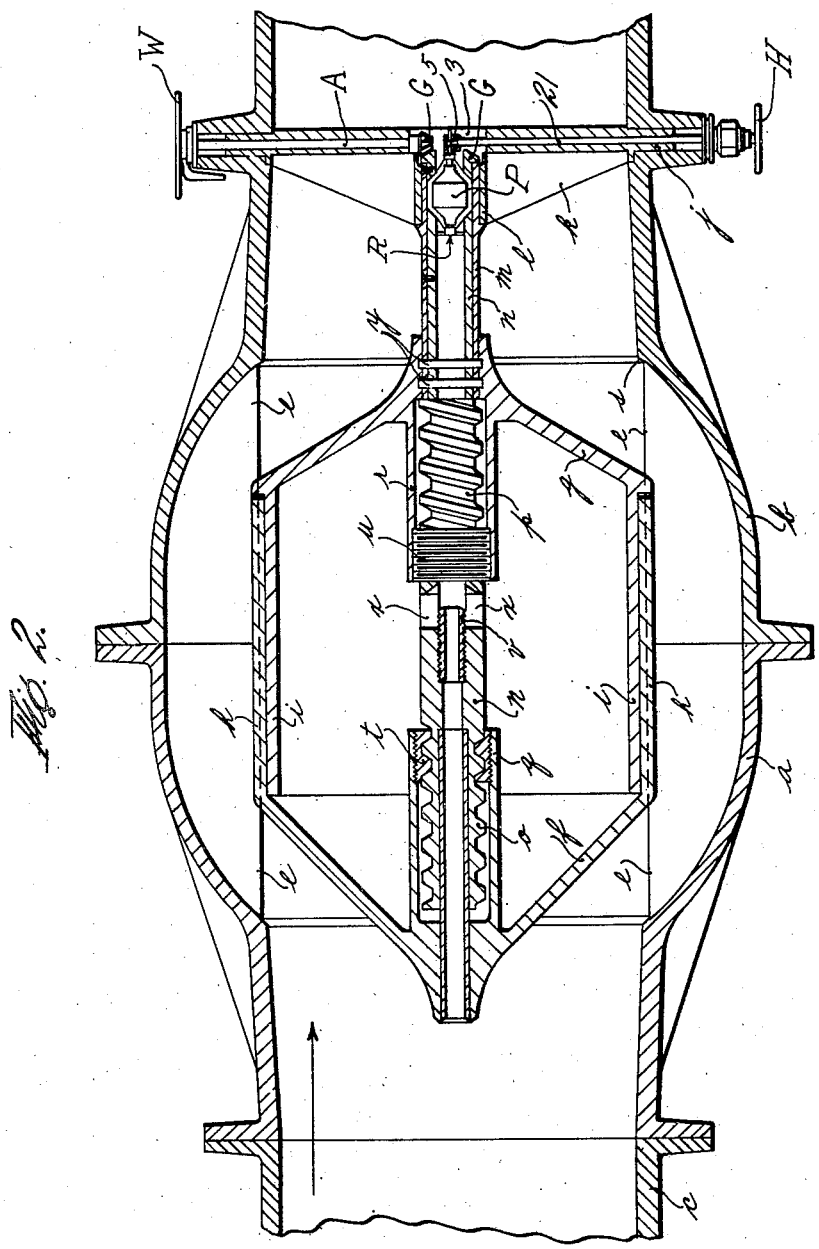

1,777,060

UNITED STATES PATENT OFFICE

RUDOLPH WELCKER, OF SPRINGFIELD, MASSACHUSETTS, ASSIGNOR OF ONE-FOURTH TO FRANKLIN G. NEAL, OF SPRINGFIELD, MASSACHUSETTS

VALVE

Application filed March 12, 1927. Serial No. 174,909.

This invention relates to an improved valve, in which the pressure of the stream flow or tendency to flow does the work of opening and closing and regulating the flow. The valve of this present invention is closely related to that shown in my co-pending application Ser. No. 37,249, filed June 15, 1925. In some respects, but not all, the valve shown in this case will do the work of that shown in my earlier application. In so far as the functions are parallel, I desire to claim the present invention as an improvement over the earlier one in structure or mode of operation. In important features, however, the present valve will accomplish functions impossible for the earlier type, under the same conditions. The present invention includes the idea of means to amplify the results of the automatic movements of one valve by having such movements cause like automatic movements of another and larger valve, all operable from the stream flow or tendency to flow through such valves.

According to the present invention, I provide a valve operating means to function from the pressure of the stream flow, particularly to start, regulate the velocity when started, and to stop the flow under a much wider range of conditions than heretofore possible in this general type of valve. In a general way I accomplish this result by applying the pressure from the stream, particularly the velocity head pressure to create a negative pressure value or positive pressure value, each as desired, within a pressure cylinder having a movable plunger head for operating the valve. The negative pressure value is of course useful in moving the valve closure means in one direction and the positive pressure value for moving it in the opposite direction. By a control means movable to different positions, I provide for the application of either extreme positive or negative pressure condition or value within the operating pressure cylinder, and I can also provide for any pressure value within the pressure cylinder between the two extremes. In this way I greatly increase the range of conditions under which the valve operating means will act with advantage.

One way I accomplish my purpose is to provide means to apply the full velocity head of the stream within the pressure cylinder and confine it there for translation into static pressure. In this way I apply the extreme or highest value of positive pressure within the pressure cylinder. To apply the extreme or highest value of negative pressure within the pressure cylinder, I apply the full velocity head to operate an injector having its low pressure inlet communicating with the pressure cylinder so as to exhaust such cylinder. By my control means I can combine the effect of applying the velocity head pressure to the cylinder with the tendency to build up the static pressure therein, with the effect of the injector having the tendency of exhausting the static pressure from the cylinder. This combination may be made in many different proportions whereby one effect may dominate the other or the two effects may give the desired value of static pressure within the cylinder. In other words, I may set my control means so that a part of the velocity head pressure is admitted to the operating cylinder for translation into static pressure and a part of the velocity head pressure is applied to operate the injector and exhaust or tend to exhaust the static pressure or a part of it in the operating cylinder. A more accurate conception of the injector action with regard to the last operation is to consider that the injector acts as a brake on the tendency to build up static pressure within the cylinder so that such pressure will be of the desired value. When the main valve is closed with only a tendency to flow in the stream, the static pressure in the operating cylinder may hold it closed. This is accomplished by setting the control valve so the injector cannot work. When it is desired to open the valve, the control valve is set so the injector will work, exhaust the pressure within the operating cylinder and permit it to open by the pressure of the stream. It is by these arrangements that I increase the sensitiveness of the valve operating means as well as the range of its operating conditions.

So far as I know, I am the first to apply means to exhaust the pressure of the operating cylinder to a negative value in this general type of valve. The means for this purpose, comprising an injector, is particularly useful. When the injector is operated by the velocity head from the high side of the valve to a controlled outlet at a low pressure area or to the low side of the valve, the valve as a whole is structurally as well as functionally improved as compared with the prior art.

So far as I know, I am the first to provide means for automatically amplifying the results of one valve by obtaining corresponding automatic results in a larger valve, both valves being operable by the power of the stream flow or tendency to flow in the pipe line in which such valves are placed.

The more detailed objects of the valve with regard to its structural and functional improvements, and its theory of operation broadly and specifically can be best understood from a description of the embodiment chosen for purposes of illustration and shown in the accompanying drawings.

Fig. 1 is a longitudinal sectional view of my improved valve sufficient to show one skilled in the art its whole structure.

Fig. 2 is a section like Fig. 1 showing the means by which the automatic movements of the valve in Fig. 1 may be amplified in a valve to control a larger stream flow.

Referring to Fig. 1, the embodiment shown comprises the main valve body 1 arranged for alignment with a pipe line shown dotted, so as not to necessitate any change of direction in the stream flow as it passes through the valve. At each of the flanged ends I show a tubular valve seat member 2 of usual construction except that each has a central bearing supported by a series of spaced arms arranged like a spider and extending from the members 2.

The bearing on the left is indicated as 4 and that on the right is indicated as 5 because the bearings differ slightly in structure. An axially arranged pipe member 7 is mounted in bearing 4. This pipe member extends to about the center of the valve where it is provided with an end flange. The bearing 5 has a cup shaped inner bearing member 6 fastened within the bearing 5 as indicated and arranged to receive and rotatably support the pipe member 8 which is substantially like the pipe member 7 and also extends to the central part of the valve body and is provided with an end flange. Each of the end flanges has a set of bolt-like projections with turned down ends to enter corresponding recesses in the adjacent flange. The shoulders on the projections abut the edges of the recesses and hold the flanges spaced apart and the ends within the recesses cause the two pipes 7 and 8 to rotate together if either one rotates. The pipes can thereby be assembled end to end by a mere relative longitudinal movement to drive the projections into the recesses.

Extending from each end flange toward the respective bearings of pipes 7 and 8, is a threaded cylinder 13 which is held against the flange by the collar 14 and these threaded cylinders are also keyed to their respective pipes so that they cannot rotate relatively to the pipe. The cylinder 13 on pipe 7 is threaded oppositely to the cylinder 13 on the pipe 8. On each of the threaded cylinders 13 I provide an internally threaded sleeve 15, to turn in threaded engagement on its respective cylinder. Each sleeve 15 is mounted at the end of an inwardly extending cylinder 20, one mounted integrally on each of the plunger heads 16 and 17. These plunger heads are respectively mounted on the pipes 7 and 8 and are arranged to move to and from their opposed valve seats, all as shown in Fig. 1. The sleeves 15 are keyed to the cylinders 20 so that the plunger heads 16 and 17 with their respective cylinders 20 and sleeves 15 will all rotate together when operatively connected, as I will now describe.

A skeleton cylinder or cage 10 is mounted outside of and around both sleeves 20 and so as to bridge the space between sleeves 20. A series of holes as shown in cage 10 permit free passage of liquid from the bridged space to the outside of the cage. Extending from each end of cage 10 are a circular series of slots 9 open at their outer ends and in which a corresponding series of outwardly extending lugs at the free ends of cylinders 20 are adapted to ride with a fairly close fit from side to side in the slots 9. The engagement of the lugs with the sides of slots 9 serve as a driving means for rotation so that sleeves 20 and cage 9 and both plunger heads 16 and 17 will all rotate together whenever one of such parts rotates. But the construction of cage 10 with sleeves 20 permits a relative axial movement of the sleeves in opposite directions without interference. The cage 10 is really a special clutch for rotary driving movements so arranged as not to interfere with longitudinal sliding movements. By reason of slots 9 the longitudinal movements of sleeves 20 may take place while the driving action is taking place. I could accomplish some of the results of cage 20 by providing cooperating dove-tail sliding members between the cylindrical overlapping extensions 18 and 19 of plunger heads 16 and 17. These extensions as shown in Fig. 1 form with the plunger heads 16 and 17 a pressure cylinder enclosing a special pressure space within the valve at all times. I desire to have the fit between extensions 18 and 19 such that there will be no substantial leak in the joint of the pressure cylinder formed by these extensions and to have such fit permit sliding movements with a small amount of friction. By placing the driving clutch between and around cylinders 20, I obtain a less expensive structure and one with the advantage of rotating one plunger head by movement of the other without any substantial twisting strains on the important parts of the structure such as extensions 18 and 19.

With out going fully into the theory of the valve operation, it will be seen that if plunger head 16 moves to the left it must necessarily rotate, due to the fact that the sleeve 15 cannot move to the left without turning on the threaded cylinder 13. The same fact is correspondingly true of plunger head 17. Thus if there is any fluid pressure within the power cylinder acting to move either one of the plunger heads, such plunger head must rotate as it moves along its guiding pipe. From the structure above described, the rotation of one of the plunger heads cannot take place without rotating the other plunger head in the same direction; and due to the fact that the cylinders 13 are oppositely threaded and held against rotation on pipes 7 and 8, it will be obvious that the plunger heads 16 and 17 must move longitudinally in opposite directions as they are rotated in the same direction. By this construction, each plunger head will move to and from its seat S as the other plunger head is moved to and from its seat. One plunger head cannot move without the other, due to their mechanical connections.

Within the pipe 7 at the central part of the valve and extending part way across the space between the end flanges of pipes 7 and 8, I provide an injector nozzle 11 so that any fluid flowing through the pipe 7 will be directed toward the pipe 8 and tend to or actually cause an injector action or a suction action on the fluid in the power cylinder defined by the plunger heads 16 and 17 and their cylindrical extensions 18 and 19. If the valve is used in steam, for example, it is feasible (by reason of the injector action) to empty the internal chamber of the valve of any water formed by steam condensation by providing the driving connection or clutch by the dove-tail and slot connections between extensions 18 and 19 and omitting the cage 10. Radial pipes going to the bottom of the pressure chamber and extending through the end flange of pipe 7 would suck up the liquid in the chamber. But the structure shown in Fig. 1 just as shown, will handle steam as well as a liquid like water, even though the steam condenses in the pressure chamber. If the valve is operated to exhaust the chamber and steam is the fluid, of course the heat will quickly evaporate any water from condensed steam in the chamber and this evaporating action will be aided when the injector is working to exhaust the pressure in the chamber.

At the right-hand side of the bearing 5 I have provided a valve seat arranged transversely of the opening through bearing 5 which is aligned and directly communicating with the opening in pipe 8. This valve seat is provided to receive the valve stem 21. This construction illustrates my control valve arrangement on the low pressure side of the main valve in the embodiment shown. The valve stem 21 is moved to and from its seat by turning an ordinary valve handle 27 which may be threaded at the top and extend to the outside of the main valve casing as shown. The control valve handle 27 is provided with an indicator 26 adapted to sweep over any suitable scale 28 so as to indicate the position of the valve stem 21 with respect to its seat.

With the structure arranged as shown in Fig. 1, the operation will now be described. Assume that the stream flow is from left to right through the valve as indicated by the arrow. When the valve stem 21 is firmly on its seat, the pressure of the stream flow is directed to the pressure chamber or power cylinder through pipe 7 and cannot escape through pipe 8. Since this pressure is continually supplied, it causes the the piston heads 16 and 17 to move in opposite directions, if they are open when stem 21 is seated. The piston head 16 moves under static pressure against the outside dynamic pressure of the stream flow. The piston head 17 moves in the opposite direction from piston head 16 and through the mechanism already described combines the efforts to close the valve. Not only is the piston head 17 moved with much more effective force by reason of the fact that it is not opposing the stream flow, but also by reason of the fact that the stream flow through the right-hand port 2 or by the main valve seat S, causes a suction action on the head 17. The pressure of the stream (when running at high velocity) at right angles to its direction is comparatively very small, as is well known. The full value of velocity head pressure is translated on the inside of the power cylinder to static pressure which works on piston head 17 against this small outside pressure at head 17. Thus we have a very large effective pressure working on the piston head 17 which is particularly useful in closing the valve when the velocity head is small. The piston head 16 is also worked on by the static pressure in the power cylinder but not so effectively as piston head 17. The valve is by this operation (particularly the motion of head 17) completely closed under all conditions of flow.

When it is desired to open the valve, the valve stem 21 is raised entirely from its seat, the velocity of the stream flow through the pipe 7 and through the injector nozzle 11 directed through pipe 8 will act with great rapidity to relieve the pressure within the power cylinder. The pressure directly against the piston head 16 will be the effective working pressure to move it and through the mechanical connections to move piston head 17, both of them to the position shown in Fig. 1.

When it is desired to move the piston heads to some intermediate position between full open and closed positions, this may be done by moving the control valve stem 21 to an intermediate position so as to throttle but not to close the normally unrestricted flow through the valve by means of its central control passage. This throttling action will cause a pressure within the power cylinder in proportion to the setting of the control valve, so that with a given tendency to flow in the main pipe line the piston heads 16 and 17 may be balanced against the pressures acting to give a desired velocity or volume through the main valve passage for a given time.

The features of improvement in the structure and mode of operation of the valve described are particularly pointed out in the claims. Some of the practical uses which make such features important will now be described.

An automatic stop operation will first be described. Suppose for example, that the control valve is set about as shown in Fig. 1 and a flow is started through the valve. This setting would under some conditions cause the piston heads to move to an intermediate or partially closed position. Suppose under these conditions everything is running in the pipe just as desired and suddenly the pipe breaks on the low pressure side so that the back pressure on the right-hand side of the valve drops practically to zero or less and causes a great increase of velocity in the flow of the stream through the main passage of the valve. This causes a great suction force on the outside of piston head 17. The head 16 is tapered so that the effect of the dynamic force against head 16 is minimized. The static pressure within the pressure cylinder is decreased. But the combined effect is dominated by decreased pressure on the outside of piston head 17 so that the static pressure in the cylinder, although less than before, has a greater effect in moving head 17 than before. Therefore, the valve is quickly closed with the movement of head 17 to its seat S, and the movement of head 16 at the same time eases the movement so that head 17 will not slam closed. When the repair is made in the line on the low side, the valve may be opened by opening control valve 21 far enough to let the injector take the pressure out of the power cylinder, after which the valve is reset as in Fig. 1 for emergency action.

The valve shown in Fig. 1 may be used as a governor and in this use automatically control or vary the volume of fluid to a turbine, for example. In this use as the turbine takes an increased load, it tends to slow up, the back pressure is increased so as to affect the pressure conditions at the valve and the piston heads will move open to permit an increase in volume and to reestablish the original velocity. This will occur because the condition of balance between the action of the static pressure in the pressure cylinder and the throttled injector action depends on the velocity of the flow and not on its volume. The action for a given valve setting will always tend to maintain a constant velocity for such setting regardless of the volume flowing through the valve. Thus if a turbine on the pipe line instead of slowing down, due to an increased load, tends to speed up due to a lessened load, the valve will move to maintain the desired velocity by a decrease in volume and the one at which the turbine will operate properly under its lessened load. This is the governor action of the valve, as an illustration. It will be noted that the pressure change due to any tendency of the turbine to slow down or to race, will be immediately felt at the valve and by its movement be corrected.

If I place two of my valves in a pressure pipe line so as to mark off a section of the pipe line between them and reverse their positions so that the upstream one will have its control valve on what is normally the low pressure side and the down-stream one with its control valve on the high pressure side of the flow, any break in the section between them will shut both ends of such section, and isolate it from the rest of the line. In this arrangement, the control of the downstream valve should be closed. This isolation of the break happens because the break in the pipe section between the valves automatically reverses the flow through the down-stream valve in which the control valve is normally on the high pressure side of the valve. By the reversal of flow, such closed control valve becomes situated on the low pressure side of that valve just as the control valve is located in its companion valve, and both valves at the ends of the broken section will operate in the same way to stop the flow toward the break from both directions.

In the present invention, considering the single valve of Fig. 1, I consider it a preferable improvement in construction to have the control valve on the low side of the main valve. This enables me to open the valve with the injector action because the injector is always ready to work under the complete domination of the control valve and this is important when the main valve is closed. The location of the control valve as I show it makes it possible to greatly simplify the construction of the mechanical power applying mechanism connected with the main valve. These features constitute some of the improvements over the earlier construction shown in my co-pending case.

Without intending to over-emphasize any particular feature of improvement in the present invention, it is desirable to note that the idea of exhausting means as well as pressure supplying means for the valve operating power cylinder, is of prime importance. The range of variations in pressures within and without the power cylinder is enormously increased by the provision of an exhausting means. I do not desire to confine this means specifically to an injector means, but point out that such means is specifically well adapted for the purpose on account of its complete cooperation with the valve operations.

I consider it an important but not a necessary feature in all aspects to have my plunger heads tapered preferably with an angle to the stream flow of 45° or less and preferably not over 60° to get the full effects I desire.

I will now describe the means for amplifying in an automatic manner any of the power movements of the parts shown in Fig. 1 by corresponding, although not necessarily identically arranged larger parts so as to control a larger pipe line or one in which the effects of the valve of Fig. 1 may be translated to another like valve.

The construction shown in Fig. 2 accomplishes these results and is an extension of the ideas involved in the construction of Fig. 1. Much of the description of Fig. 1 applies directly to the construction of Fig. 2. The extension of the ideas will, therefore, be readily appreciated.

In Fig. 2 I have shown means to use the valve of Fig. 1 as the control valve of a much larger valve. The latter has the same characteristic operations as its control valve and will normally follow the operating movements of the control valve, whatever they are. From this standpoint, the control valve may be considered as a pilot valve for the operations of the main valve. To avoid confusion I shall refer to the automatic control valve as the pilot or control valve with relation to the main valve, and I shall refer to the hand operated valve, the setting of which determines the movements of the pilot valve as the hand valve. There is, therefore, to be considered the hand control valve, the pilot or automatic control valve, and the main valve. The main valve is under the control of the pilot valve and the pilot valve is under the control of the hand valve.

The main valve casing is made in two parts $a$ and $b$ joined together at the center through the flanges shown which may be bolted together after the parts have been assembled in the interior. The pipe section $c$ is joined to the valve in the ordinary way at the high pressure side of the valve. But at the low pressure side I interpose a supporting section $j$ between valve casing $b$ and pipe section $d$ to carry some of the parts of the pilot and main valve. The section $j$ is provided with a spider or radial webs $k$ to support the central bearing $l$. In this open ended bearing arranged axially of the pipe line I mount my pilot valve.

The casing and seats for the pilot valve are formed from the down-stream end of the axially arranged pipe section $n$, forming part of the main valve and that part which serves for the restricted passage of fluid through the main valve independently of the position of the main valve closures. The pipe section $n$ has a bearing sleeve $m$ around it and extending from support in bearing $l$ to support in the nose of plunger head $g$ of the main valve. The latter has piston ring members $y$ to prevent leakage through the nose as the plunger head moves longitudinally of sleeve $m$. A spider arrangement within pipe section $n$ has a bearing for the restricted pipe passage R through pilot valve P. The other end of this pipe arrangement for passage R is supported in bearing 5 mounted in a spider arrangement carried by supporting section $j$.

The pilot valve P, its passage R, its construction and operating features have already been described in connection with Fig. 1 and the description of the pilot valve need not be repeated here except as additional features are added. The hand valve for controlling pilot P is operated from the outside of the big pipe line by extending stem 21 through supporting section $j$ to the bottom and outside the pipe line. The stem 21 is turned by handle H which may sweep over a scale to indicate its position or be under remote control by any of the well-known means for remote control of such valve stems.

I provide a shaft A also extending through supporting section $j$ to the top and outside the pipe line. This shaft has an operating wheel W. At the inner end of this shaft A I provide a beveled spur gear which meshes with a beveled gear on the end of pipe section $n$. This beveled gear arrangement is provided so as to rotate the pipe section $n$ by turning wheel W from a point outside the main pipe line. The wheel W has an indicating arm arranged to sweep over a scale and show the position of the main valve closures at all times. The purpose of turning pipe section $n$ will be described later.

The main valve is constructed with plunger heads $f$ and $g$ which have overlapping cylindrical extensions $h$ and $i$, the surfaces of which are smoothly finished to avoid friction and closely fitted to prevent leakage. The plunger heads with their cylindrical extensions are in this way arranged to make the power cylinder for the main valve. This power cylinder is supported from the sections of the valve casing $a$ and $b$ by means of a set of radially extending ribs $e$, each of which is closely fitted in a groove as indicated in dotted lines in Fig. 2, so as to support the power cylinder in axial alignment with the main pipe line passage and to prevent its rotation.

Each plunger head has a cylinder extending inwardly from its nose. These cylinders are indicated as *r* and *q* and are of much less diameter than the diameter of the power cylinder. Their inner ends are spaced apart for a reason to be described. At the end of each of the cylinders *r* and *q* I provide an internally threaded supporting bearing, that on the left being indicated by *t* and that on the right by *u*. These bearings may be externally threaded in order to position them in the cylinders *r* and *q*, but they should be rendered immovable by keys after positioning with respect to said cylinders.

The pipe section *n* previously mentioned extends through the nose of the plunger head *g* through the cylinder *r*, across the space between the cylinders *r* and *q*, and to the interior of cylinder *q*. In that portion of the pipe section *n* adjacent to the cylinder *r* I provide a thread adapted to engage the internal thread of the bearing sleeve *u*. In a like manner I provide a thread on the pipe section *n* to engage the internal thread of the sleeve *t*. The cooperating threads between pipe sections *n* and *t* are arranged opposite to the cooperating threads of the pipe sections *n* and *u*—that is, one is a right-hand thread and the other is a left-hand thread. In the pipe section *n* extending between the ends of cylinders *r* and *q* I provide a set of openings *x* so that the fluid within the pressure cylinder may have access to the interior of pipe section *n*. Adjacent these openings *x* I provide an injector nozzle *v* within the pipe section *n* so as to receive the stream flow from the high pressure side of the valve, act as an injector on the fluid entering pipe section *n* through the openings *x* and direct such fluid through the pipe section *n* to the low pressure side of the cylinder leading to the pilot valve P.

The plunger head *f* has an axially arranged opening through its nose provided with a small pipe section as indicated, so as to telescope with the pipe section *n* toward the high pressure side of the valve.

From the description of the structure given, it will be seen that if there is enough force applied within the pressure cylinder of the main valve so as to axially move either one of the plunger heads *g* or *f*, the other plunger head will necessarily move axially in the opposite direction. This movement of the plunger heads together with their overlapping cylindrical extensions will take place without rotation and in this respect the construction differs from the somewhat similar construction described in connection with Fig. 1. In the present arrangement the means by which the movement of one of the plunger heads is necessarily caused to move the other plunger head at the same time, is found in the fact that as plunger head *g*, for example, moves to the right, the bearing sleeve *u* will turn the pipe section *n*, since it is necessary on account of the threaded arrangement between the sleeve *u* and the threads *p* for one of the parts to rotate as they move relatively in an axial direction. Since according to the description it is not possible for the plunger head *g* or its cylinder *r* to rotate, it is necessary for the pipe section *n* to rotate or otherwise the longitudinal movement could not take place. As the pipe section *n* is rotated in the example given, it will necessarily move the bearing sleeve *t* which is oppositely threaded, to the left, and thus the plunger head *f* is moved to the left. The ribs *e* are shown as engaging the cylindrical extension *h* of the plunger head *f* and so as to prevent the latter's rotation. It will also be noted that the ribs *e* engage the plunger head *g* in corresponding slots, just the same as plunger head *f* is engaged by reason of the flanged extension of the plunger head *g* in line with the cylindrical extension *h*.

I have already described the movements of the plunger heads provided with the pilot P by reference to Fig. 1. I will now describe the specific operation of the valve shown in Fig. 2.

With the parts of the structure as shown in Fig. 2, assume that the hand valve is wide open. The stream flow from the left passes through pipe section *n* through the injector nozzle *v* so as to exhaust the main valve pressure cylinder and continues through pipe section *n* until it reaches the pilot valve P. The plunger heads of this valve are wide open so that the stream flow passes by the pilot valve along its main passages and in addition through the central passage R, having the same effect on the plunger heads of the pilot valve P as it has on the plunger heads of the main valve *g* and *f*. This effect is to exhaust the pressure in both pressure cylinders, with the result that the pressure of the stream flow holds the plunger heads in the main valve and the pilot valve as far away from their respective seats as possible, or in wide open position. Now assume that the hand valve is completely closed by moving stem 21 through the hand control H. This action will prevent any further stream flow through pipe R to the low pressure side of the pilot valve. The velocity head of the stream flow, therefore, is directed within the pressure cylinder of the pilot valve P. It is there translated to static pressure and both plunger heads of the pilot valve P are moved to their seats in the manner described in connection with Fig. 1. When the pilot valve is thus closed, it will be seen that the stream flow through the pipe section *n* can no longer reach the low pressure side of the pilot valve because the latter's main passages have been completely stopped. This results in the pressure velocity of the stream flow being applied through the openings $x$ to the interior of the pressure cylinder of the main valve, so that it is there translated to static pressure and moves both plunger heads $q$ and $f$ to their respective seats $s$. This results in closing the main pipe line or the flow through pipe sections $c$ and $d$.

One of the advantages of the operation so far described is that by the turning of valve handle H and the setting of valve stem 21 which is relatively extremely small as compared either with the pilot valve P or the main valve, the result is that the main valve is automatically closed. Except for the inner position of the pilot valve P of course the operation is the same as described in connection with Fig. 1, but the point is that as the size of the main valve increases it is apparently necessary to increase the size of the control valve, but there is a practical limit to the hand control valve, so I have shown in Fig. 2 a means of avoiding any increase of the actual size of the hand control valve, while retaining all the advantages of my automatic operation in any sized valve and in fact increasing such advantages because the action of the valve in Fig. 2 will be more sensitive than the valve of Fig. 1. This is accomplished by interposing the pilot valve which is automatically controlled by the hand valve and is in turn the control valve for a still larger valve. The fact that these control valves are immersed in the center of the stream is important as the power is there at its greatest. The pilot valve P is an automatic step-up for the operation of the hand valve $h$ whereby the latter may be kept within a size very easily operated regardless of the size of the main valve.

Except for this feature, the operation of the main valve in Fig. 2 has the same general functions as the operation of the valve in Fig. 1, the principal difference as stated being in the means of controlling the valve. Of course there are variations in structure which lead to advantages in convenience of manufacture or use for one purpose or another. The showing made in Fig. 2 illustrates and emphasizes one of the principal features with regard to the inventions of either Fig. 1 or 2; namely, that the power of the stream flow is efficiently applied to operate the valve without applying power from external sources. Not only will the valve open and close, but it will also function automatically according to the setting of the control valve and variations in velocity of the stream flow.

I have indicated in Fig. 2 a means for closing the main valve from an external power source if desired; but this is not at all with the intention of indicating any more than an abnormal operation of the valve shown in Fig. 2. That is to say, if there is no flow through the pipe line at all and it is desired to move the valve closures to full open or closed position for any reason, it can be done by turning the hand wheel W through the beveled gear arrangement $g$ which rotates the pipe section $n$ with the expected results on the movements of plunger heads $q$ and $f$. Furthermore the position of the hand wheel H with relation to a scale will show me the position of the main valve closures at all times.

I have not described in connection with Fig. 2 the various settings of the control valve as I did in connection with the control valve of Fig. 1, and the ways in which the valve may operate to act as an automatic stop valve or as a governor for a turbine, or in other uses. It is not believed necessary to repeat these descriptions of function for the reason that it will be readily seen as the hand wheel H is set between full open and closed position for any desired automatic governing action of the pilot valve P, it will control the flow through the pipe section $n$ exactly as the flow through the main line was controlled in connection with Fig. 1, and this fact results in the exactly similar control of the main valve, and thus the flow through the main passages of the main valve are controlled.

I consider the means disclosed in Fig. 2 as particularly important because it discloses a way to amplify the automatic power movements of one valve a way to amplify such movements to be followed by like movements of a larger valve, all operated by the power of the stream flow. I believe I am the first to accomplish this result of amplification. The means by which this result is accomplished is relatively very simple as compared with the factors of the stream control which enter into the valves' operation and use.

I claim:

1. A valve comprising a casing, automatic means within the casing to open and close the valve by the power of the stream flow or tendency to flow through the casing, means providing for a partial flow under full velocity head through the valve independently of the operation of said automatic means, said automatic means being operable at all times according to variations of the velocity of said partial flow and a control valve for the partial flow operable at any time to cause such variations said control valve having precision mechanism to actuate it to any one of many control positions which may differ by extremely small increments of adjustment.

2. A valve having a casing with aligned inlet and outlet openings, an axially arranged small pipe for a restricted passage extending from each opening toward the center of the valve casing, the opposed ends of such pipes being spaced apart, an injector nozzle directed from the pipe opening from the high pressure side of the valve towards the pipe opening from the low pressure side of the valve, a power cylinder surrounding the opposed ends of said pipes, a plunger head means movable in the power cylinder to open and close at least one of said valve openings and a control valve to open, close, or throttle the restricted passage in the pipe on the low side of the valve, whereby the effect of the pressure in said power cylinder on the plunger head means through the elements of the restricted pasage, the injector and control valve, may be predetermined over a very wide range, said restricted passage from the high pressure side of the valve being at all times open to the power cylinder and the power cylinder being at all times open to the low pressure side of the valve through said restricted passage, except as the control valve is operated towards closed position.

3. A power valve comprising a casing, a pressure operable mechanism within the casing for opening and closing the valve by the fluid pressure of the stream, means to permit the passage of a portion of the stream flow to influence said pressure mechanism at all times, injector means operable by such portion of the stream flow to control its influence on the pressure mechanism, and a control valve in the passage for such portion of the stream flow and operable to permit the latter to reach the low pressure side of the valve casing in any desired proportion whereby said pressure mechanism may be placed under the maximum influence of said portion of the stream to close the valve or the absolute maximum influence to open the valve due to the injector action or any degree of influence between these two extremes.

4. A power valve comprising a casing, a pressure cylinder within the casing having at least one plunger head operable to open and close the valve and means to control the pressure within said cylinder including a passage for a portion of the stream flow from the high pressure side of the valve to the casing, and a passage from the casing to the low pressure side of the valve, an injector device in such passages operable from the high pressure side of the valve when the latter is in closed or open condition to exhaust the pressure in the cylinder and a control valve in said passage to the low pressure side of the valve operable from without the casing at any time to completely throttle the low pressure port or to open said port and permit the injector device to have its effect on the pressure conditions within the cylinder according to the position of the control valve.

5. A valve having therein a power cylinder with a valve closure piston head at each end, means to cause said heads to move longitudinally in opposite directions to and from their seats, means providing a restricted passage independently of the position of said piston heads through said cylinder from the high to the low side of said valve, an injector in said restricted passage having its high pressure nozzle and its low pressure inlet both in direct communication with the interior of the power cylinder and its outlet passage through the outlet passage of said restricted passage at the low side of the valve and a control valve in said outlet passage, said control valve being operable from without the valve, all constructed and arranged to operate said valve closing piston heads according to the tendency of the stream flow on the valve.

6. A valve comprising a casing with aligned inlet and outlet ports, valve operating means arranged centrally of the casing and including a power cylinder with tapered plunger heads in the ends and automatically movable to and from said ports according to pressure value within the cylinder, means to apply the velocity head pressure from the high side of the valve to the interior of the power cylinder, means to exhaust the pressure within the cylinder to sub-normal, and control means to combine the effects of the velocity head pressure and the exhausting means to give a resultant pressure value within the cylinder for any given flow or tendency to flow of the main stream within which the valve is placed.

7. A valve including a casing with aligned ports, a power cylinder along the axis of the casing, a plunger head closure at each end of the cylinder, mechanism connecting the plunger heads to require them to move together but in opposite axial directions whenever one is moved, means to admit velocity head pressure from the high side of the valve to the cylinder and injector means to exhaust the pressure fluid from the cylinder to the low side of the valve and a control valve operable to predetermine the relative effects of the means to admit pressure, and the injector means to exhaust pressure within the cylinder.

8. A valve comprising a casing, automatic means within the casing to open and close the valve by the power of the stream flow or tendency to flow through the casing, means providing for a restricted passage from the high to the low side of the valve independently of the operation of said automatic means and a control valve for said restricted passage at its outlet end, said automatic means being adapted for operation by application of pressure from said restricted passage, said control valve permitting application of such pressure at all times, and to varying degrees according to its setting.

9. A valve comprising a casing having at least one valve seat, an axially arranged pipe construction for a restricted passage through the valve from its high to its low side independently of its valve seat, a power cylinder concentric with the pipe construction and with at least one plunger head valve closing means to cooperate with the valve seat, pressure operable power means within the cylinder and subject to the pressure therein to operate the plunger head and a control valve for said restricted passage located at the low pressure side of the valve casing to apply the pressure of said restricted passage to the power cylinder.

10. A valve casing having two aligned valve seats, an axially arranged power cylinder having oppositely disposed plunger heads, one for each valve seat, and overlapping sleeves forming the cylinder, said plunger heads having inwardly extending aligned small cylinders with their ends spaced apart and connected by a clutch for slidable rotation, and provided near the ends of such cylinders with oppositely and internally threaded sleeves mounted on threaded bearing cylinders, a pipe section axially mounted in the casing with said cylinders thereon and along which the plunger heads move axially in opposite directions.

11. A valve including a power cylinder and plunger head, means to open and close the valve by the operation of the plunger head, control means operable to admit pressure within the cylinder, an injector operable to exhaust pressure from the cylinder, said control means being operable to partially throttle the action of the injector as pressure is admitted to the cylinder and to permit the injector to exhaust pressure from the cylinder as pressure in the cylinder is released.

12. A valve including a power cylinder and plunger head, means to open and close the valve by the operation of the plunger head, an injector operable in a restricted passage from the high side of the valve to exhaust the pressure in the plunger head to the low side of the valve and control means operable to partially throttle the action of the injector whereby the pressure within the cylinder may be raised or lowered by the tendency of the flow in such restricted passage to and from the cylinder.

13. A valve having a power cylinder and piston operable by pressure to open and close the valve, means providing a passage for velocity head flow from the high side of the valve to the power cylinder, means providing a passage for velocity head flow from the power cylinder to the low side of the valve, said passage means forming an injector with its low pressure inlet in communication with the power cylinder, and a control valve in the outlet passage from the injector to the low side of the valve.

14. A power valve having substantially a stream line passage therethrough, a pressure cylinder mounted centrally of the valve having tapered plunger heads movable to open and close the valve, means providing for a limited passage through the cylinder and plunger heads independently of the cylinder walls and control means in such independent passage to change the pressure in said cylinder by supplying or withdrawing fluid from the cylinder to any desired degree whereby a plus or minus pressure value may be established in the cylinder.

15. A power valve having substantially a main passage therethrough, a pressure cylinder mounted therein having plunger heads movable to open and close the main passage, means providing for a limited passage through the cylinder and plunger heads independently of the cylinder walls and control means in such independent passage adapted to establish either a positive or a negative pressure within said cylinder by supplying or withdrawing fluid from the cylinder.

16. A valve comprising a casing, an axially arranged bearing shaft within the casing, a multi-part power cylinder mounted within the casing and on said shaft for support and surrounding the latter and provided with at least one plunger head arranged to slide axially of the shaft and cause the opening and closing of the valve and power mechanism operable by pressure within the cylinder to assist the movement of said plunger head, said plunger head being arranged so as to be also subjected to the same pressure as said mechanism.

17. A valve comprising a casing, automatic means therein operable by the pressure of the stream flow to open and close the valve, said means including a pressure cylinder with a valve operating plunger and an externally controlled means beyond all control of the plunger to partially exhaust said pressure cylinder when desired, said plunger being movable between open and closed position in a path at all times outside the path of movement of said externally controlled means.

18. A valve comprising a casing, automatic means within the casing to open and close the valve by the power of the stream flow or tendency to flow through the casing, means providing for a partial flow under full velocity head through the valve independently of the operation of said automatic means, said automatic means being operable according to variations of the velocity of said partial flow and a control valve for the partial flow to cause such variations, and a second valve comprising the same elements and having the first mentioned valve arranged as its control valve.

19. A valve comprising a casing, a valve closure automatically operable under the power of the stream flow within the casing, an unobstructed control passage through said closure and the center of the casing, a closure for the control passage also automatically operable under the power of the stream flow, and means to apply the power of the stream flow from the control passage to the second mentioned valve closure and by operating it to apply the power of the stream flow to the first mentioned valve closure.

20. A valve comprising a casing with a main valve closure therein, automatic means operable from the power of the stream flow to move the valve closure, a central control passage through said closure and automatic means in said passage operable to apply the power of the stream flow to the main valve passage, and a second central control passage having hand operable means to apply the power of the stream flow to the automatic means in the first mentioned control passage.

21. A power valve comprising a casing and means automatically operable to control a power flow through such casing, said means including three concentrically disposed flow passages and valve closures therefor, one closure for the main passage, one for a much smaller control passage, and one for a still smaller control passage, all such passages having an unobstructed flow from the high pressure to the low pressure side of the casing, which flow in each passage at all times depends upon the position of the valve closure in such passage alone, said automatic means being operable to position the two larger closures in accordance with the setting of the smallest closure of the three flow passages.

22. A power valve comprsing a valve casing having means therein providing for three aligned concentric fluid passages, a separate valve closure for each passage, two power cylinders, one around each of the two inner passages and adapted to serve as automatic means for moving the valve closure of the passage outside the one it surrounds, and means to operate the closure for the inner passage to control the power flow to and from the cylinder surrounding it, the operation of the closure in the intermediate passage being adapted to control the power flow to and from the cylinder surrounding said intermediate passage.

23. A valve including a casing, a pressure cylinder spaced within the casing so as to be submerged in any stream flow through the casing, a plunger head for the cylinder arranged by its movements to open and close the valve and means to change the pressure within the cylinder comprising an injector having an operating fluid feed from the high pressure side of the valve, an exhaust outlet to the low pressure side of the valve and a suction feed from the interior of the cylinder and a control valve for the injector operable when moved to different positions to predetermine the influence of the injector on the pressure conditions of said cylinder.

24. A valve operable by the energy of the stream flow in which the valve is placed, including a pressure cylinder with a plunger head movable to operate the valve according to the pressure conditions in said cylinder and an injector having feed passages to both sides of the valve and to the pressure cylinder, said feed passages being normally open independently of the position taken by the plunger head and a control valve for the injector adapted to direct the fluid through the injector feed passages in various ways so as to establish a positive pressure in the cylinder, to establish a negative pressure in the cylinder, or to establish a combination of positive and negative pressure tendencies due to the flow through said injector.

25. A valve for the purpose described, including a fluid pressure mechanism adapted to open and close the valve, an injector arranged to change the values of fluid pressure applied to said mechanism, a control valve arranged to determine the action of the injector at any stage in the operation of said mechanism, both the injector and said mechanism being operable by the energy of the stream in which the valve is placed.

26. A valve for the purpose described, including a fluid pressure mechanism adapted to open and close the valve, means arranged to establish a negative as well as a positive pressure on said mechanism, a control valve for said means operable to determine what pressure is applied to said mechanism at any stage in the operation of the latter, both said means and mechanism being operable by the energy of the stream in which the valve is placed.

27. In a valve of the type described, a casing, a power cylinder having a plunger head closure and a second plunger head oppositely disposed in the cylinder, an axially arranged bearing pipe means, rotatively supported in the casing and on which said plunger heads are mounted to slide, said pipe means having access to both sides of the cylinder and to the interior thereof, screw threaded means in said power cylinder arranged to cause the plunger heads to rotate as they slide under the influence of pressure on either side of said plunger heads, and means to mechanically connect said plunger heads to transmit rotary motion from one to the other, said screw threaded means being connected to said heads with oppositely disposed threads to cause them to slide in opposite directions as they rotate in the same direction, said pipe means being free to rotate as the plunger heads rotate.

28. A power valve comprising a casing having a pressure cylinder provided with a movable plunger head and a valve seat therefor, a passage or by-pass around the valve seat independently of the plunger head, an injector in said passage having feed passage for the injector supply from the fluid pressure on the valve and at all times independent of the position of the plunger head and with a suction passage for the injector communicating with the pressure chamber, said suction passage being likewise independent of said plunger.

29. A valve comprising a casing, automatic means within the casing to open and close the valve by the power of the stream flow or tendency to flow through the casing, means providing for a partial flow through the valve independently of the operation of said automatic means, said automatic means being operable according to variations of the velocity of said partial flow and a control valve for the partial flow to cause such variations, and a second valve comprising the same elements and having the first mentioned valve arranged as its control valve.

30. A valve comprising a casing, automatic means within the casing to open and close the valve by the power of the stream flow or tendency to flow through the casing, means providing for a partial flow to or from the casing to effect the operation of said automatic means, and a control device for said partial flow arranged to apply the operating effect of the partial flow on said automatic means at any time independently of the latter's movement or position, said control device including a valve located outside said automatic means, and passages for the partial flow leading to and from said means and through the control valve.

31. A valve comprising a casing, a pressure cylinder having two oppositely disposed plunger heads spaced within the casing, mechanism connecting the piston heads to constrain their movements in opposite directions, inlet and outlet ports at least one having a valve seat closure cooperating with one of said piston heads as a main valve closing means, and means providing at all times independently of said pistons for a partial flow under the stream line pressure, and means providing at all times independently of said pistons for a partial flow from said pressure cylinder to a point beyond the valve closure, and a control means for said partial flow means operable outside said pressure cylinder and from without the casing whereby the partial flow with the stream line pressure may be directed to the pressure cylinder or a partial flow directed from the pressure cylinder to the low pressure side of the valve independently of the piston position.

32. A valve comprising a casing, automatic means within the casing to open and close the valve by the power of the stream flow or tendency to flow through the casing, means providing for a partial flow through the valve independently of the operation of said automatic means, said automatic means being operable according to variations of the velocity of said partial flow and a control valve located outside said automatic means for the partial flow to cause such variations.

In testimony whereof I have affixed my signature.

RUDOLPH WELCKER.